(12) United States Patent
Mort

(10) Patent No.: US 6,585,190 B2
(45) Date of Patent: Jul. 1, 2003

(54) CRASHWORTHY AIRCRAFT SEAT

(75) Inventor: Raymond W. Mort, Hurst, TX (US)

(73) Assignee: Skyline Industries, Inc., Ft. Worth, TX (US)

( * ) Notice: Subject to any disclaimer, the term of this patent is extended or adjusted under 35 U.S.C. 154(b) by 0 days.

(21) Appl. No.: 10/155,445

(22) Filed: May 24, 2002

(65) Prior Publication Data

US 2003/0052229 A1 Mar. 20, 2003

Related U.S. Application Data

(63) Continuation of application No. 09/648,841, filed on Aug. 25, 2000, now Pat. No. 6,394,393.

(51) Int. Cl.[7] .................................................. B64D 11/06

(52) U.S. Cl. ........................ 244/122 R; 297/216.1; 297/216.17

(58) Field of Search ................. 244/122 R; 297/216.1, 297/216.13, 216.15, 216.16, 216.17

(56) References Cited

U.S. PATENT DOCUMENTS

| 4,408,738 | A | * | 10/1983 | Mazelsky | 244/122 R |
|---|---|---|---|---|---|
| 4,523,730 | A | * | 6/1985 | Martin | 244/122 R |
| 5,152,578 | A | * | 10/1992 | Kiguchi | 297/216.16 |
| 5,273,240 | A | * | 12/1993 | Sharon | 244/122 R |
| 5,558,301 | A | * | 9/1996 | Kerdoncuff et al. | 244/122 R |
| 5,791,597 | A | * | 8/1998 | Knoll | 244/121 |
| 5,842,669 | A | * | 12/1998 | Ruff | 244/122 R |
| 6,378,939 | B1 | * | 4/2002 | Knoll et al. | 297/216.1 |
| 6,450,449 | B1 | * | 9/2002 | Podob et al. | 244/122 R |

* cited by examiner

Primary Examiner—J. Woodrow Eldred
(74) Attorney, Agent, or Firm—Charles D. Gunter, Jr.

(57) ABSTRACT

A crashworthy aircraft seat for protecting a passenger during a crash of the aircraft includes a support structure coupled to the aircraft, a seat assembly slidingly associated with the support structure, guide means coupled to the support structure for guiding upright members of the seat assembly as the seat assembly slides relative to the support structure, and means for variably attenuating kinetic energy as the seat assembly and the passenger move downward relative to the support structure from an initial static start position to an end position during the crash.

5 Claims, 5 Drawing Sheets

VARIABLE LOAD/STROKE EA CURVE

VARIABLE LOAD/STROKE EA CURVE

CRASHWORTHY AIRCRAFT SEAT

CROSS REFERENCE TO RELATED APPLICATIONS

The present application is a continuation of Ser. No. 09/648,841, filed Aug. 25, 2000, U.S. Pat. No. 6,394,393.

BACKGROUND ART

1. Field of the Invention

The present invention relates generally to crashworthy aircraft seats, and in particular, to crashworthy aircraft seats with variable energy attenuation.

2. Description of Related Art

Crashworthy aircraft seats have been around for some time. The first such seats were designed for pilots, but soon after, crashworthy seats for other passengers, such as military troops, began to appear. These crashworthy seats are most often used in aircraft that take off and land vertically, such as helicopters, tilt rotor aircraft, and other rotary wing aircraft. These type of aircraft are more susceptible to vertical hard landings and crashes. The purpose of crashworthy aircraft seats is to eliminate unnecessary injuries and fatalities in relatively mild impacts and minimize injuries and fatalities in severe survivable mishaps.

For typical crashworthy aircraft seats, the weight of a seat portion, the passenger, and the passenger's gear combine to create a "stroking load." In a hard landing or crash, the stroking load moves downward over a certain "stroke distance" relative to a support structure of the crashworthy seat. The goal of the crashworthy seat is to absorb and attenuate the kinetic energy of the stroking load as it moves over the stroking distance, thereby transferring the kinetic energy away from the passenger. Because the human spine can only withstand limited compressive forces, inadequate energy absorption by a crashworthy aircraft seat during a hard landing or crash can result in serious spinal injury or death.

There are many factors that the affect the weight of passengers or troops in a crashworthy aircraft seat, including: whether the troop is male or female, the troop's weight percentile, and whether the troop is equipped with gear or not. As one might expect, crashworthy aircraft seats are frequently used by passengers and troops for which these factors vary widely. For example, an unequipped female troop in the 5th weight percentile weighs about 110 pounds, while a fully equipped male troop in the 95th weight percentile weighs about 241 pounds. Anthropometric data on male and female troops is widely available.

Most crashworthy aircraft seats involve a seat assembly that slides relative to a frame assembly in the event of a hard or crash landing, referred to herein as a "crash pulse." Although various means are used to attenuate the kinetic energy of such landings, the energy attenuation means generally fall into one of four categories: (1) hydraulic or pneumatic cylinders; (2) tube deformers or splitters; (3) metal shavers; or (4) wire deformers or benders. Although some crashworthy aircraft seats have means of adjusting the energy attenuation according to the size of the passenger or occupant, none provide variable energy attenuation during a single crash pulse or crash event.

The first category of crashworthy aircraft seats, those that include hydraulic or pneumatic cylinders to attenuate energy, usually involve complicated linkages to which the cylinders are coupled. An example of such a device is the aircraft seat disclosed in U.S. Pat. No. 5,558,301 issued to Kerdoncuff et al. In the Kerdoncuff et al. seat, as the passenger sits down in a non-pivoting seat, the weight of the passenger causes the orientation of the linkage to change, resulting in a proportionate change in energy absorption during a crash pulse. The energy absorption of these types of devices are adjustable, but not variable. In other words, the initial energy absorption setting may be adjusted, but it does not vary during a single hard landing or crash pulse.

The second category of crashworthy aircraft seats, those that include tube deformers or splitters, usually involve tubes that are deformed one or more times by one or more dies as a seat assembly slides relative to a frame assembly during a crash pulse. Examples of such devices include U.S. Pat. Nos. 4,997,233 and 5,273,240, both issued to Sharon. In the Sharon seats, as a seat assembly slides relative to a frame assembly, tubular members are forced through one or more dies that deform the tubular members. Although the latter device allows for self adjustment of the energy absorption, neither of these devices exhibit variable energy attenuation during a single crash episode or crash pulse.

The third category of crashworthy aircraft seats, those involving metal shavers, is exemplified by U.S. Pat. No. 5,842,669 issued to Ruff. In the Ruff seat, as a non-pivoting seat assembly slides relative to a frame assembly, elongated members are shaved, or planed, by cutting elements, thereby absorbing energy during a crash pulse. Such shaving devices do not provide for variable energy attenuation during a single crash landing or crash pulse.

The forth category of crashworthy aircraft seats, those that deform or twist wires to absorb energy, involve plastically deforming one or more wires by drawing, twisting or bending. An example of a wire twisting device is U.S. Pat. No. 4,408,738 issued to Mazelsky. An example of a wire drawing device is U.S. Pat. No. 4,523,730 issued to Martin. In the Mazelsky seat, as a non-pivoting seat assembly moves relative to a frame assembly during a crash pulse, wires coiled around telescoping tubes are plastically twisted, thereby absorbing energy. In the Martin seat, as a non-pivoting seat assembly slides relative to a frame assembly, wires are drawn through dies and deformed, thereby absorbing energy. Neither of these devices allow for variable energy attenuation during a single hard landing or crash pulse.

For these reasons, it is clear that although significant strides have been made in the crashworthy aircraft seat industry, significant shortcomings remain.

BRIEF SUMMARY OF THE INVENTION

Because the developments in the area of crashworthy aircraft seats have not adequately addressed the issue of variable energy attenuation, there is a need for a crashworthy aircraft seat that can absorb or attenuate the energy of a single crash pulse at a variable rate, regardless of the weight of the passenger in the seat. Prior-art crashworthy aircraft seats are not capable of variable energy attenuation during a single hard landing or crash pulse.

Therefore, it is an object of the present invention to provide a crashworthy aircraft seat that can absorb or attenuate the energy from a hard landing or crash at a variable rate during the crash pulse.

It is another object of the present invention to provide a crashworthy seat for an aircraft which can absorb or attenuate the energy from hard or crash landings at a variable rate, wherein the crashworthy seat has a quick release means so that the crashworthy seat can be quickly and completely removed from the aircraft.

It is another object of the present invention to provide a crashworthy seat for an aircraft which can absorb or attenuate the energy from hard or crash landings at a variable rate, wherein the crashworthy seat is mounted entirely to an aircraft bulkhead so that damage to the aircraft floor or ceiling does not affect the operation of the crashworthy seat.

It is another object of the present invention to provide a crashworthy seat for an aircraft which can absorb or attenuate the energy from hard or crash landings at a variable rate, wherein the energy is attenuated by a variable energy attenuating device including a wire bending apparatus and a plastically deformable wire having a non-uniform transverse cross-sectional geometry along the length of the wire.

It is another object of the present invention to provide a crashworthy seat for an aircraft which can absorb or attenuate the energy from hard or crash landings at a variable rate, wherein the energy is attenuated by a variable energy attenuating device including a wire bending apparatus and a plastically deformable wire having a non-uniform transverse cross-sectional geometry along the length of the wire, and the wire is restrained and plastically deformed multiple times in a zig-zag fashion to prevent the crashworthy seat from rebounding back upward after the downward stroke in which the energy from a crash is attenuated.

These objects are achieved by providing a crashworthy seat for an aircraft having a support structure coupled to the aircraft, the support structure including an upper portion and a lower portion. A seat assembly having a plurality of upright members is slidingly associated with the support structure. A guide means is coupled to the support structure for guiding the upright members as the seat assembly slides relative to the support structure. A variable energy attenuating device for plastically deforming a wire is coupled to the seat assembly. The plastically deformable wire passes through the variable energy attenuating device, but is coupled at one end to the upper portion of the support structure, and at the other end to the lower portion of the support structure. The wire has a selected transverse cross-sectional area that is non-uniform over its length. As the seat assembly slides relative to the support structure, the wire is plastically deformed by the variable energy attenuating device, whereby the kinetic energy of the sliding seat assembly is attenuated at a selected variable rate by the plastic deformation of the wire as the seat assembly slides relative to the support structure. The seat assembly remains in a static start position during normal operation and slides into an end position only during hard landings or crash events.

The plastically deformable wire has a non-uniform cross-sectional geometry selected to produce a predetermined relationship between stroking distance and stroking load. The selected cross-sectional geometry allows the crashworthy seat to accommodate a wide range of loads without the need for complicated weight detection devices or manual adjustment devices. The wire is restrained and plastically deformed multiple times in a zig-zag fashion. This prevents the crashworthy seat from rebounding back upward after the downward stroke in which the energy from a crash is attenuated. The seat is mounted to an aircraft bulkhead to allow the seat to function properly should the aircraft floor or ceiling be deformed during a crash. The seat is mounted with quick release pins to allow for quick and complete removal of the seat from the aircraft.

The present invention provides significant advantages. Primarily, the crashworthy aircraft seat of the present invention provides variable energy attenuation during a single crash event or crash pulse. In the present invention, a wire having a non-uniform cross-sectional geometry along its length is plastically deformed to attenuate the energy of a hard landing or crash. By selectively varying the cross-sectional geometry of the wire, it is possible for a single crashworthy aircraft seat to accommodate a wide range of passengers. For example, the seat of the present invention can accommodate and protect a wide range of military troops, from an unequipped female in the 5th weight percentile, or about 110 pounds, to a fully equipped male in the 95th weight percentile, or about 241 pounds. Protection in this range is accomplished, for the first time, without the need for complicated weight detection devices, or manual adjustment devices. The passenger does not have to estimate the weight of himself and his gear. Nor does the passenger have to manually adjust the energy attenuation value. The non-uniform cross-sectional geometry of the deformable wire is selected to produce a predetermined relationship between stroking distance and stroking load over a wide range of loads without the need for any manual adjustment.

These and other objects and advantages of the present invention will be apparent in the following detailed description when read in conjunction with the accompanying drawings.

BRIEF DESCRIPTION OF THE DRAWINGS

The novel features believed characteristic of the invention are set forth in the appended claims. The invention itself however, as well as a preferred mode of use, will best be understood by reference to the following detailed description of an illustrative embodiment when read in conjunction with the accompanying drawings, wherein:

DETAILED DESCRIPTION OF THE PREFERRED EMBODIMENT

Figure 1:
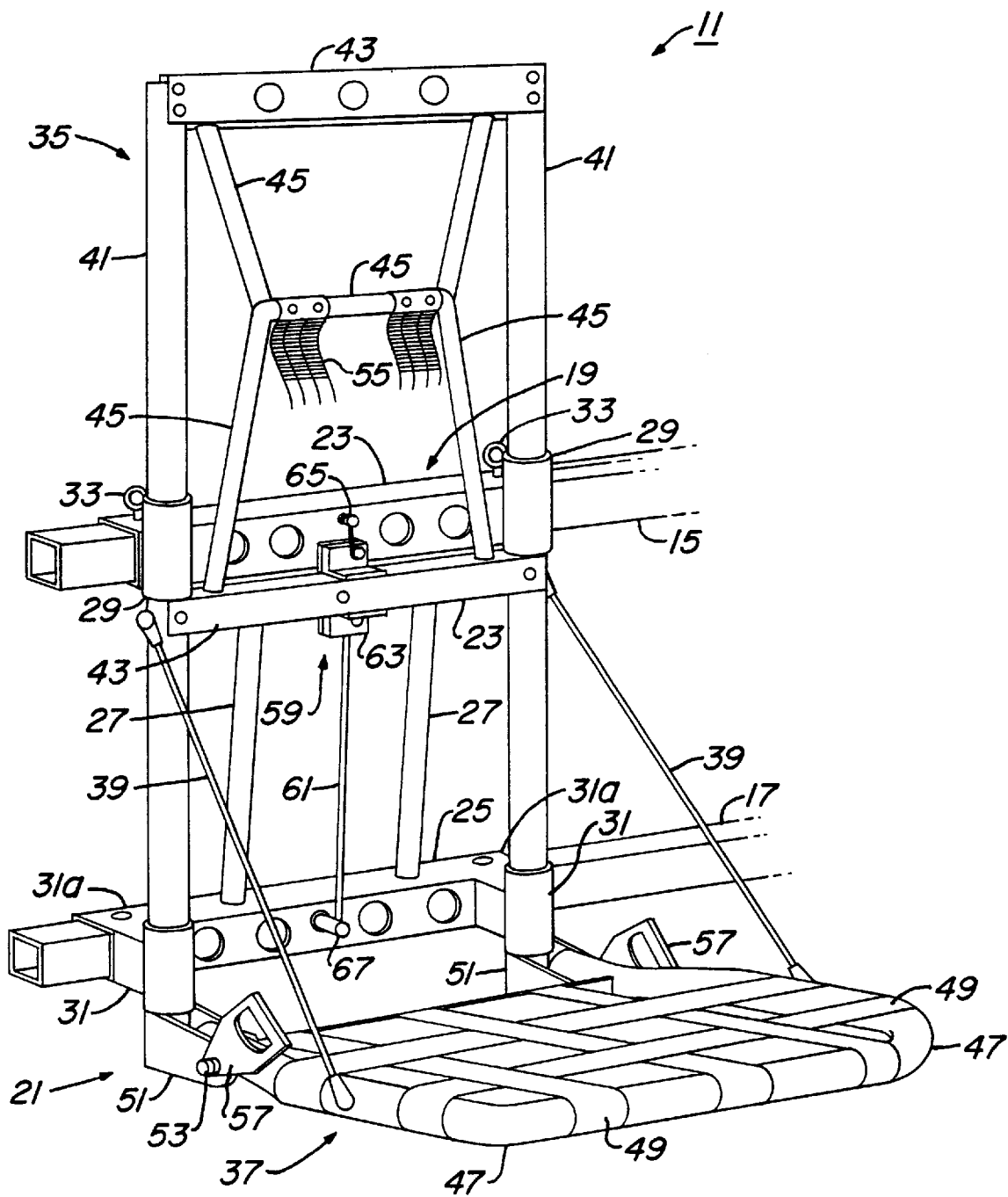
FIG. 1 is a perspective view of the crashworthy aircraft seat according to the present invention.

Referring to FIG. 1 in the drawings, the preferred embodiment of a crashworthy aircraft seat 11 according to the present invention is illustrated. Crashworthy aircraft seat 11 is used primarily in aircraft that take off and land vertically, such as helicopters, tilt rotor aircraft, and other rotary wing aircraft, as these type of aircraft are more susceptible to vertical hard landings and crashes. It will be understood that crashworthy aircraft seat 11 may be used in other type of craft for which attenuation of energy from a vertical, or near-vertical, impact is desired. It is preferred that crashworthy aircraft seat 11 be coupled to the aircraft at a sidewall or bulkhead to ensure that crashworthy aircraft seat 11 functions properly during a crash, as the floor and ceiling of the aircraft typically undergo extensive deformation during the crash. In FIG. 1, the aircraft bulkhead is represented by upper bulkhead rail 15 and lower bulkhead rail 17.

Seat 11 includes two main components: a support structure 19 and a seat assembly 21 that is slidingly associated with support structure 19. Support structure 19 includes a generally horizontal upper portion 23 and a parallel lower portion 25. Upper portion 23 and lower portion 25 are separated and supported by a plurality of upright posts 27. A plurality of upper guide means 29 are coupled to upper portion 23, preferably one at each lateral end of upper portion 23. In a similar fashion, a plurality of lower guide means 31 are coupled to lower portion 25. Upper guide means 29 and lower guide means 31 may be integral to upper portion 23 and lower portion 25, respectively. Lower guide means 31 includes flanges 31a that extend over lower bulkhead rail 17 to aid in releasably coupling lower portion 25 of support structure 19 to lower bulkhead rail 17. Conventional fittings (not shown) may be attached to upper and lower bulkhead rails 15 and 17 to facilitate attachment of upper portion 23 and lower portion 25.

Upper and lower guide means 29 and 31 include quick release mechanisms 33 for releasably coupling upper and lower rails 23 and 25 of support structure 19 to upper and lower bulkhead rails 15 and 17. Quick release mechanisms 33 are preferably spring-biased pins, which when pulled upward allow upper and lower rails 23 and 25 to be quickly decoupled from upper and lower bulkhead rails 15 and 17, thereby allowing quick and complete removal of crashworthy aircraft seat 11 from the aircraft. The pins of quick release mechanisms 33 pass through the shear center of upper and lower bulkhead rails 15 and 17 to reduce the possibility of the introduction of torsional loading in upper and lower bulkhead rails 15 and 17. It is desirable that the weight of crashworthy aircraft seat 11 be as low as possible, while maintaining sufficient strength. The upper portion 23, lower portion 25, upright posts 27, upper guide means 29, and lower guide means 31 are all preferably made of steel but other rigid metals or metal alloys such as aluminum alloy can be utilized as well.

Continuing with reference to FIG. 1, seat assembly 21 includes a seat back portion 35 and a seat bottom portion 37. Seat bottom portion 37 is coupled to the lower end of seat back portion 35, and is supported in an "in-use" position in which seat bottom portion 37 is substantially perpendicular to seat back portion 35 by a plurality of support cables 39. It is preferred that seat bottom portion 37 be pivotally coupled to seat back portion 35. Therefore, when not in use, seat bottom portion 37 maybe pivoted upward toward seat back portion 35 into a "stowed" position, in which seat bottom portion 37 is substantially parallel to seat back portion 35. Because crashworthy aircraft seat 11 is mounted to the aircraft at a side wall or bulkhead at upper and lower bulkhead rails 15 and 17, when seat bottom portion 37 is in the stowed position, space in the aircraft is maximized. The ability to quickly pivot seat bottom portion 37 into the stowed position also provides ease of ingress and egress, particularly in emergency loading and evacuation situations.

Seat back portion 35 is formed from a framework of rigid members, preferably made of aluminum, including a plurality of upright members 41, a plurality of generally horizontal members 43, and a plurality of harness support members 45. Harness support members 45 are preferably located in the upper half of seat back portion 35. Seat bottom portion 37 is formed from a U-shaped member 47, preferably made of aluminum tubing, around which straps or webbing 49 are wrapped to form a seat cushion. The open ends of U-shaped member 47 are received by a pair of clevis brackets 51, one of which is coupled to the lower end of each upright member 41. The open ends of U-shaped member 47 are pivotally coupled to clevis brackets 51 by pins 53, thereby allowing seat bottom portion 37 to pivot relative to seat back portion 35 about pins 53. It should be understood that clevis brackets 51 may be integral to either upright members 41 or U-shaped member 47, provided that seat bottom portion 37 is free to pivot relative to seat back portion 35.

Harness support members 45 provide support for straps 55 of an adjustable harness assembly, straps 55 being shown only partially in FIG. 1. The harness assembly shown in FIG. 1 is a conventional four-point harness, two straps 55 of which are attached to harness support members 45, and two other straps of which (not shown) are attached to clevis brackets 51 at plates 57. As is typical with such four-point harness assemblies, straps 55 are coupled together at a single, centrally located, quick-release buckle (not shown). It should be understood that other harness assemblies, such as five-point harness assemblies may be used, as well.

Continuing with reference to FIG. 1, each upright member 41 slidingly extends through one upper guide means 29 and one lower guide means 31. In this manner, seat assembly 35 is slidingly associated in a generally vertical fashion with support structure 33. It is preferred that upright members 41, upper guide means 29, and lower guide means 31 have coaxial circular cross-sections, and that upright members 41 are disposed within upper guide means 29 and lower guide means 31. However, other cross-sectional geometries are possible, provided that upright members 41 are free to slide relative to upper guide means 29 and lower guide means 31. For example, it is possible that upper guide means 29 and lower guide means 31 do not completely surround upright member 41.

Crashworthy aircraft seat 11 includes a plurality of variable energy attenuating devices 59. Although only one such energy attenuating device 59 is shown in FIG. 1, it is preferred that crashworthy aircraft seat 11 include at least two variable energy attenuating devices 59, one located adjacent to and to the rear of each upright member 41. Such positioning protects energy attenuating devices 59 from undesirable incidental damage. Further, locating energy attenuating devices 59 adjacent to and parallel to upright members 41 reduces the possibility of undesirable torsional loading on energy attenuating device 59.

In the preferred embodiment of the present invention, each variable energy attenuating device 59 includes a plastically deformable wire 61 and a wire bending apparatus 63. Wire 61 has a non-uniform transverse cross-sectional geometry over the length of wire 61. Wire 61 rigidly extends in a generally vertical fashion, with an upper end 65 being coupled to upper portion 23 of support structure 19, and a lower end 67 being coupled to lower portion 25 of support structure 19. Wire bending apparatus 63 is coupled to seat back portion 35. As will be explained below, wire 61 passes through wire bending apparatus 63, such that wire bending apparatus 63 does not move relative to wire 61 until a predetermined load is exceeded. Because wire 61 is rigidly coupled to support structure 19, and wire bending apparatus 63 is rigidly coupled to seat assembly 21, seat assembly 21 will only slide relative to support structure 19 if wire bending apparatus 63 moves relative to wire 61, that is, if the predetermined load is exceeded.

Figures 2, 3:
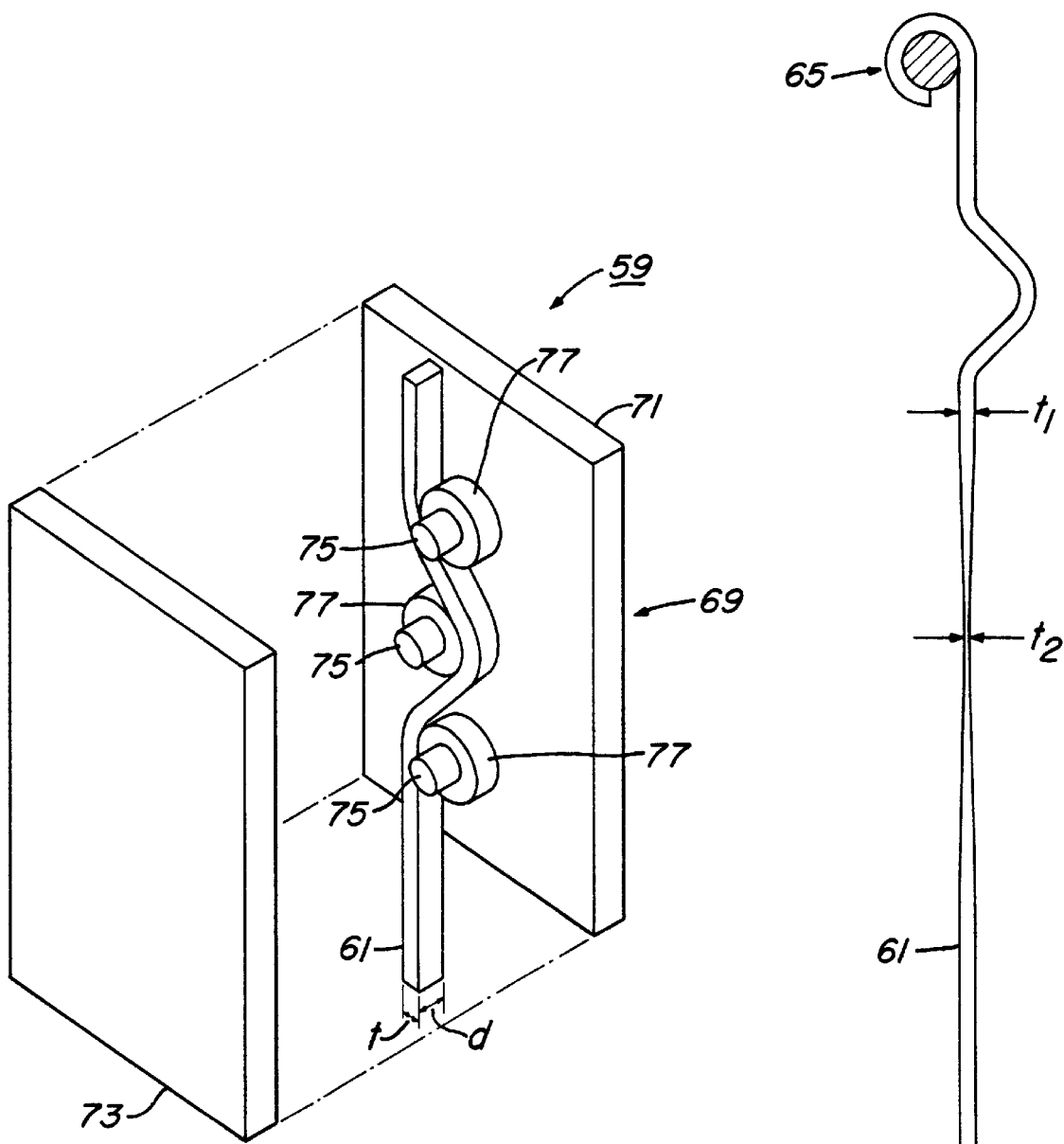
FIG. 2 is an exploded view of the variable energy attenuating device of the crashworthy aircraft seat of FIG. 1.
FIG. 3 is a front view of the plastically deformable wire of having a non-uniform transverse cross-sectional geometry along its length according to the present invention.

Referring now to FIG. 2 in the drawings, variable energy attenuating device 59 is illustrated in an exploded view. Wire bending apparatus 63 includes a housing 69 having a back plate 71, an opposing front plate 73 and a plurality of side supports (not shown) that connect back plate 71 to front plate 73. Housing 69 may include a top plate (not shown) and a bottom plate (not shown), provided that the top plate and the bottom plate include apertures through which wire 61 may pass.

It is preferred that wire 61 have a rectangular transverse cross-sectional geometry in which wire 61 has a depth d and a thickness t. Although it is preferred that depth d remain constant and that thickness t vary over the length of wire 61, it is not necessary that depth d remain constant. This is particularly true when wire 61 has a non-uniform transverse cross-sectional geometry other than rectangular, such as circular.

A plurality of shafts 75 are disposed within housing 69, each shaft 75 being perpendicularly connected to both back plate 71 and front plate 73. Shafts 75 are arranged in a zig-zag fashion, such that shafts 75 are alternatingly offset from the vertical. Each shaft 75 carries a roller 77 that may freely rotate about the corresponding shaft 75. The outside diameters of rollers 77 may be the same or may vary, depending upon the desired amount of bending imparted to wire 61 during the variable energy attenuation. Prior to final assembly of housing 69, wire 61 is pre-bent, preferably three times, such that wire 61 will pass through housing 69 and wind about rollers 75 in a zig-zag fashion. Because of the rigidity of wire 61, after assembly of variable energy attenuating device 59, housing 69 will not move relative to wire 61, unless the predetermined load is exceeded. The predetermined load is the force necessary to overcome the initial deformation load and any initial static friction and pull wire 61 through housing 69. The predetermined load is equivalent to the combined bending force necessary to simultaneously plastically bend wire 61 about all rollers 75 as housing 69 moves downward relative to wire 61.

During normal operation, crashworthy aircraft seat 11 remains in an initial, raised "start" position. Crashworthy aircraft seat 11 is shown in FIG. 1 in the start position. However, during a crash episode, or crash pulse, seat assembly 21 slides downward relative to support structure 19 into a lowered "end" position, plastically deforming wire 61 as seat assembly 21 travels downward.

It is necessary that the predetermined static load be higher than any expected load that would be placed on crashworthy aircraft seat 11 in normal operation. For example, a 180 pound passenger carrying 20 pounds of gear applying 6 g's of acceleration to seat assembly 35 would not exceed a predetermined load of 2320 pounds, which means variable energy attenuating device 59 would prevent seat assembly 21 from sliding relative to support structure 19. However, in the event of a generally vertical crash producing 15 g's of acceleration, the predetermined load will be overcome seat assembly 21 will begin to slide downward relative to support structure 19 from the start position to the "end" position in which seat assembly 21 has slid downward over a substantial length of wire 61. This downward sliding of seat assembly 21 relative to support structure 19 will cause wire 61 to be plastically deformed by bending as wire 61 is forced around rollers 75 as housing 69 moves downward relative to wire 61. In this manner, the kinetic energy of the sliding seat assembly 21 is transferred into the plastic deformation of wire 61, thereby reducing the kinetic energy transferred to the passenger.

Referring now also to FIG. 3 in the drawings, the non-uniform transverse cross-sectional geometry of wire 61 is evidenced by the variation in thickness t over the length of wire 61. In the preferred embodiment, although depth d remains constant, thickness t varies selectively over the length of wire 61, thereby defining the non-uniform transverse cross-sectional geometry of wire 61. The significance of wire 61 having a non-uniform transverse cross-sectional geometry is that as thickness t decreases, the bending force required to plastically bend or deform wire 61 decreases proportionately. Likewise, as thickness t increases, the bending force required to plastically bend or deform wire 61 increases proportionately.

It should be understood that the transverse cross-sectional geometry of wire 61 may remain constant over selected portions of the length of wire 61 and selectively vary over other selected portions of the length of wire 61, depending upon the required bending force desired at selected locations along the length of wire 61. For example, wire 61 may have an "initial" thickness $t_1$ near upper end 65, then taper inwardly to an "intermediate" thickness $t_2$ and taper outwardly to a "final" thickness $t_3$. It will be understood that the inward and outward tapering of thickness t does not have to be linear, but may form a curved thickness profile. This thickness profile is preferably made by precision machining or grinding and working of wire 61. By varying the thickness t of wire 61, the rate of energy attenuation of energy attenuating device 59 is proportionately varied.

The thickness profile of wire 61 is not arbitrary. To the contrary, the thickness t at every point along the length of wire 61, i.e., points $t_1$, $t_2$, $t_3$, and all points therebetween, is precisely predetermined so that energy attenuating device 59 attenuates the kinetic energy at a predetermined rate and according to predetermined timing. The preferred procedure for determining the selected thickness t at each point along the length of wire 61 will be discussed below.

Conventional empirical data shows that the human spine can carry a heavy load until the spine is compressed. However, after the spine is fully compressed, the spine can no longer carry as heavy a load without injury or damage. Therefore, it is desirable that an energy attenuation device attenuate kinetic energy at different rates during a single crash pulse. For example, energy attenuating device 59 attenuates more energy at the very beginning of the crash pulse as the passenger's spine is compressing, but then attenuates less energy at later times during the crash pulse after the passenger's spine is fully compressed. Not only does this feature ensure that the energy attenuation corresponds to what is happening with the passenger, this feature allows each crashworthy aircraft seat 11 to provide protection to passengers in a wide range of weight percentiles. This variation in energy attenuation during a single crash pulse is what separates the present invention from prior-art crashworthy aircraft seats, as will be explained below.

Figure 4:
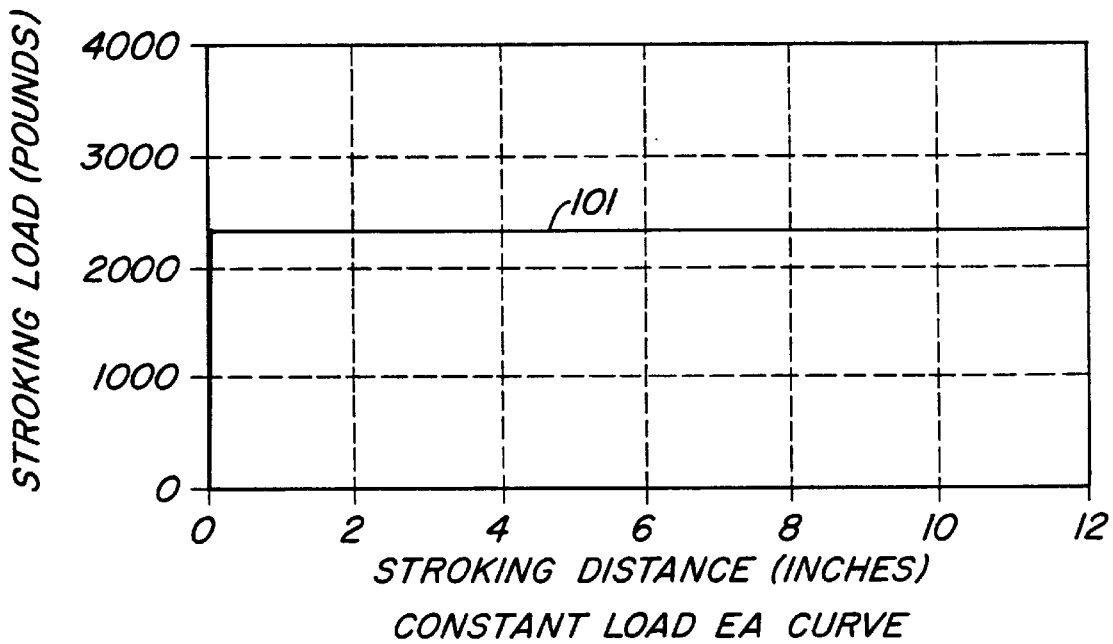
FIGS. 4 and 5 are computer simulated curves of stroking load vs. stroking distance for non-variable energy attenuating devices.

Referring now to FIG. 4 in the drawings, a computer simulated graph of stroking load vs. stroking distance for a single crash pulse is illustrated for a conventional crashworthy aircraft seat having a non-variable energy attenuation device. The "crash pulse" is defined as the hard landing or crash event, and takes place over a relatively short period of time, typically about 100 milliseconds. The "stroking load" is defined as the combined mass of seat assembly 21, the passenger, and any gear carried by the passenger or seat assembly 21, multiplied by the acceleration acting thereon. The stroking load will be expressed in pounds. The stroking load is the resultant vertical load from either forces and accelerations acting in purely the vertical direction, or forces and accelerations acting in non-vertical directions. A "stroking distance" is defined as the distance through which seat assembly 21 moves relative to support structure 19 during the crash pulse. The stroking distance will be expressed inches.

In the simulation represented in FIG. 4, a constant stroking load of 2,320 pounds over a stroking distance of twelve inches is graphed as a curve 101. The stroking load of 2,320 pounds represents the resultant vertical load of either an upward vertical acceleration of 29.9 g's and an initial downward vertical velocity of 37.5 feet/second; or an initial upward acceleration of 25.9 g's, an initial vertical velocity of 32.5 feet/second, an aft acceleration of 14.95 g's, and a forward velocity of 18.75 feet/second. As is shown, during the crash pulse, the stroking load increases quickly from zero to 2,320 pounds, and then the stroking load remains constant over the remaining stroking distance. Conventional data indicates that a stroking load of 2,320 pounds is equivalent to 14.5 g's acting on a male troop in the 50th weight percentile. As such, the non-variable energy attenuating device represented by curve 101 would provide protection to only a limited population of passengers. Any passenger or troop whose weight is less than that of a male troop in the 50th weight percentile would be subject to serious spinal injury or death.

Figure 5:
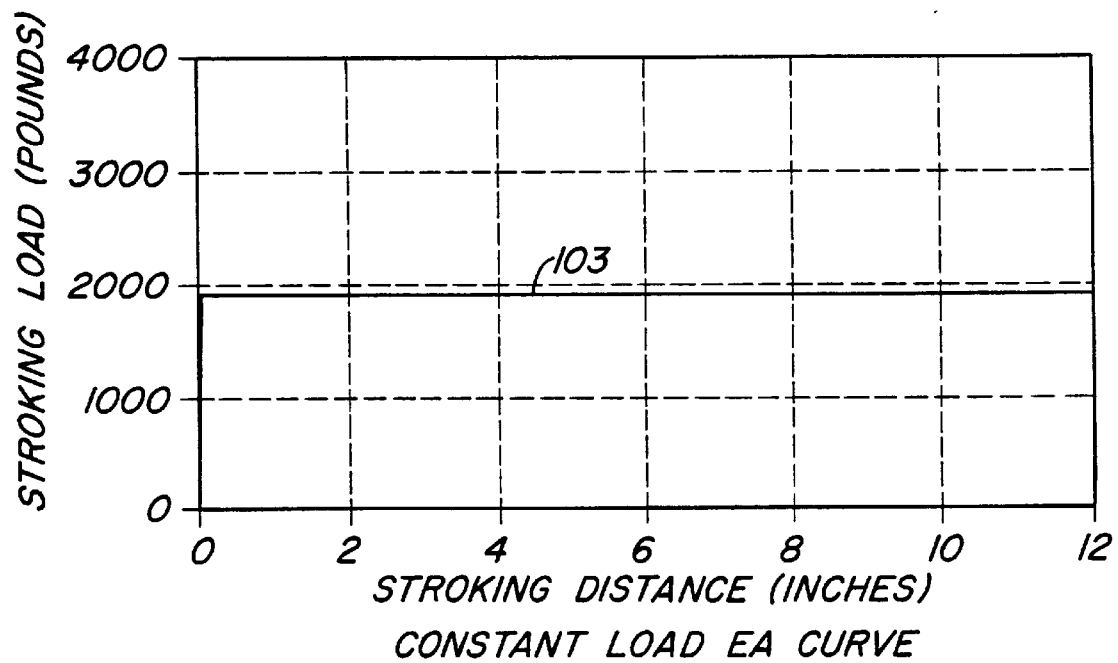

Referring now to FIG. 5 in the drawings, a similar computer simulation is depicted. However, in FIG. 5, a constant stroking load of 1,920 pounds over a stroking distance of twelve inches is graphed as a curve 103. Under the same loading conditions as set forth above for FIG. 4, conventional data indicates that the stroking load of 1,920 pounds is equivalent to 12.0 g's acting on a male troop in the 50th weight percentile. Again, the non-variable energy attenuating device represented by curve 103 would provide protection to only a limited population of passengers. Any passenger or troop whose weight is less than that of a male troop in the 5th weight percentile would be subject to serious spinal injury or death. Thus, non-variable energy attenuation devices will not satisfy the injury criteria for the desired range of passengers, i.e., from fully equipped male troops in the 95th weight percentile weighing about 241 pounds down to unequipped female troops in the 5th weight percentile weighing about 110 pounds. In order to meet the desired weight and injury criteria of the present invention, it is necessary to utilize a variable energy attenuating device, such as energy attenuating device 59.

Conventional empirical data indicates that a passenger can tolerate a relatively high load spike at the beginning of the stroke as the body is compressing. After that, the load must be reduced to prevent too much compression from being applied to the spine. In addition, for heavier passengers, the stroking load must be increased as the stroke progresses over the stroke distance to prevent the heavier passenger from bottoming out at the end of the stroke distance.

Figure 6:
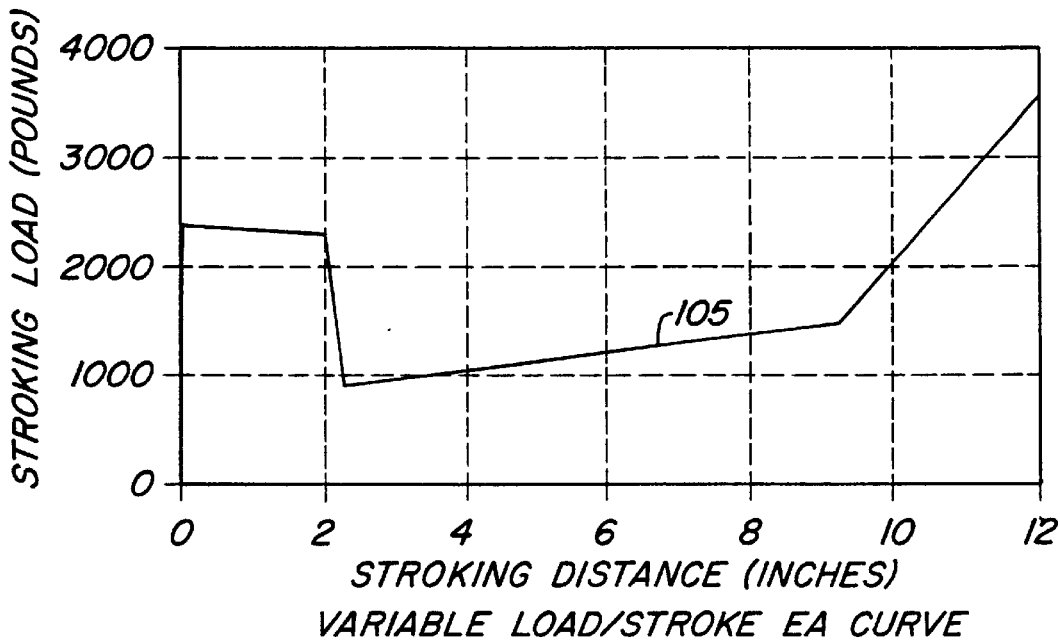
FIGS. 6 and 7 are computer simulated curves of stroking load vs. stroking distance for variable energy attenuating devices.

Referring now to FIG. 6 in the drawings, a variable stroking load over a stroking distance of twelve inches is graphed as a curve 105. Curve 105 is the resultant graph of the same loading conditions of FIG. 4, but using a variable energy attenuating device, as opposed to a constant energy attenuating device. As is shown, the stroking load quickly increases from zero to about 2,320 pounds, but instead of remaining constant over the remainder of the stroking distance, the stroking load begins to decrease sharply as the stroking distance approaches about two inches. The stroking load then begins to increase slowly over the next seven inches or so of stroking distance. When the stroking distance is about seven and one half inches, the stroking load begins to increase at a higher rate until the maximum stroking load of about 3500 pounds is reached at the end of the stroking distance. The increase in stroking distance load near the end of curve 105 is necessary to prevent heavier passengers from bottoming out when seat assembly 21 reaches the end position.

The variable energy attenuating device represented by curve 105 is selectively designed to undergo a decrease in stroking load beginning when the stroking distance is at about two inches. This decrease in stroking load generally coincides with the full compression of the passenger's spine. By designing the variable energy attenuation device to selectively decrease the stroking load once the passenger's spine is compressed, the probability of preventing spinal injury is greatly increased. Thus, the stroking load of curve 105 gradually increases as the stroking distance increases from about two inches to about seven and one half inches. Then, when the stroking distance reaches about seven and one half inches, curve 105 increases more rapidly, until the stroking load reaches a maximum at the end of the stroking distance.

Figure 7:
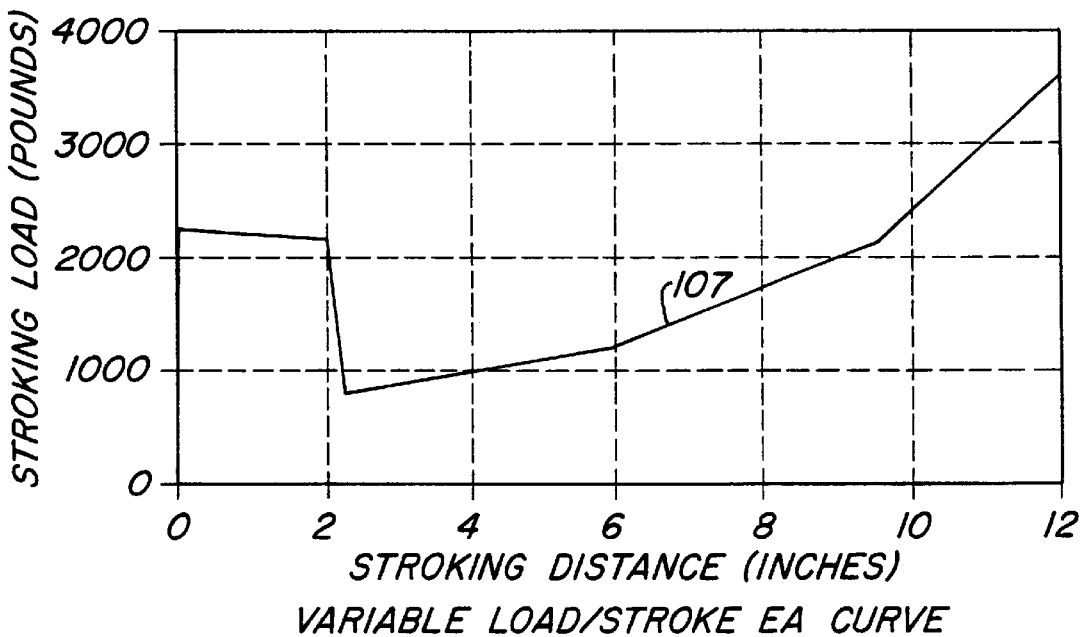

Referring now to FIG. 7 in the drawings, a curve 107 representing a variable stroking load over a stroking distance, similar to curve 105 of FIG. 6, is illustrated. However, in curve 107, the gradual increase in the stroking load after the stroking distance reaches two inches is performed in a plurality of incremental steps. These incremental steps of curve 107 are representative of the maximum allowable stroking loads for passengers in various weight percentiles. By creating curve 107 in this manner, it is possible to selectively design a variable energy attenuating device, such as variable energy attenuating device 59, to attenuate selected amounts of energy at selected times and locations during the crash pulse.

Figure 8:
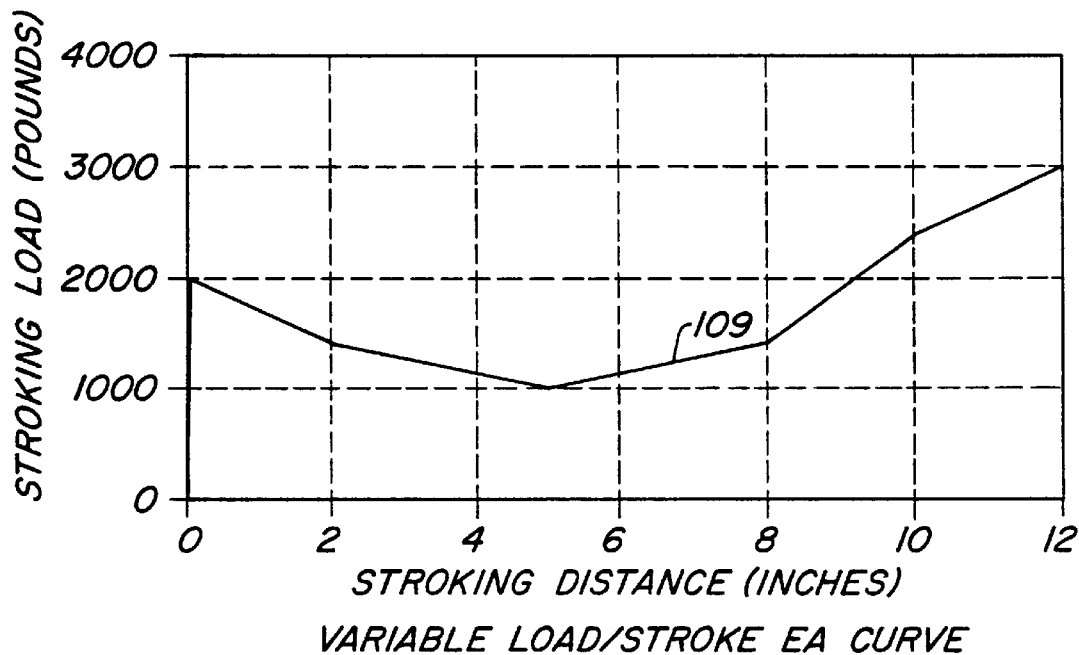
FIGS. 8 and 9 are modified computer simulated curves of stroking load vs. stroking distance for variable energy attenuating devices.
Figure 9:
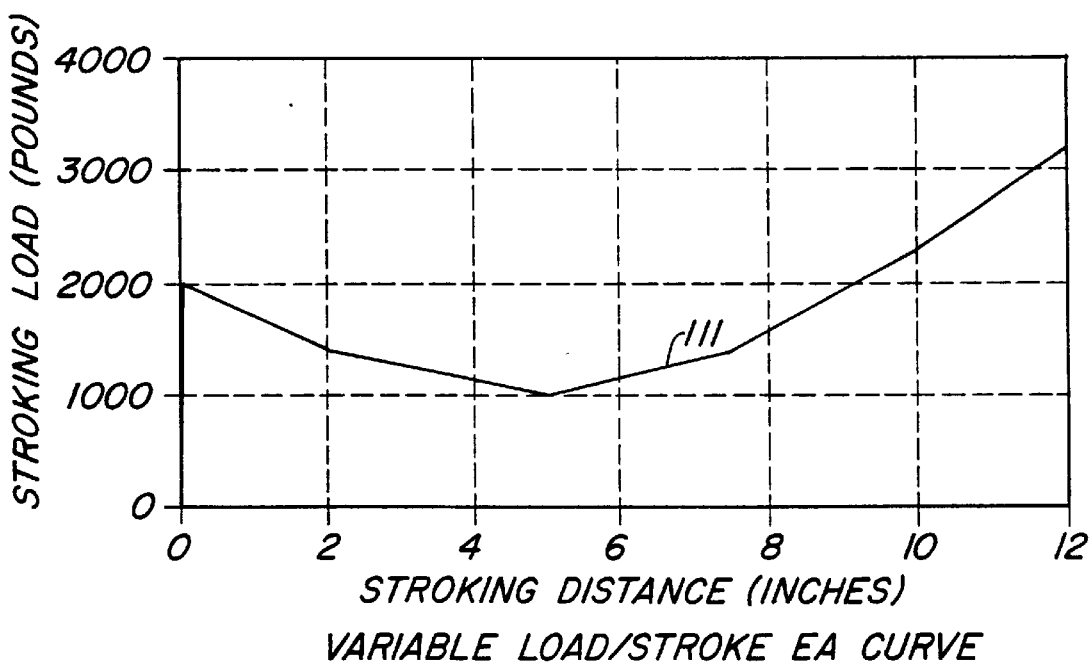

To ensure that the computer simulations represented by FIGS. 4 through 7 are accurate, it is desirable that the simulated results be compared and correlated with actual experimental data. Referring now to FIGS. 8 and 9 in the drawings, curves 109 and 111 represent modifications to curves 10 and 107 after comparisons and correlations with actual test data. As is shown, curves 109 and 111 are much more refined. In particular, curves 109 and 111 slope much more gradually during the first two inches of the stroking distance. By using this method, various correlations and corrections can be made to the stroking load vs. stroking distance curve, thereby providing the necessary parameters to design a variable energy attenuating device that can provide protection for passengers in a full range of weight percentiles, for example, from an unequipped female troop in the 5th weight percentile up to a fully equipped male troop in the 95th weight percentile.

The use of computer simulated curves is an efficient way to obtain the necessary values for stroking load at certain stroking distances. The bending force required to plastically deform wire 61 is proportional to the cross-sectional geometry and area of wire 61, as well as, other physical properties of wire 61. By using computer simulated curves, such as curves 109 and 111, it is possible to obtain precise transverse cross-sectional dimensions for wire 61 that result in selected variable energy attenuation. It should be understood that other methods may be used to obtain these values.

In the present invention, wire 61 is preferably made of steel or similar metal for which the bending properties are well known or easily attainable. Wire 61 is then mechanically worked or ground down at certain locations by conventional working or precision grinding techniques, such that the bending properties of wire 61 are selectively modified at selected locations along the length of wire 61. In the preferred embodiment, a rectangular cross-sectional geometry is maintained. By using experimental stroking load vs. stroking distance curves, such as curves 109 and 111, the specific required dimensions of wire 61 can be obtained. Once the required dimensions of wire 61 are known, wire 61 can be worked or precision ground to the specific dimensions, such that energy attenuating device 59 attenuates energy at a predetermined variable rate during a single crash pulse. Thus, the rate of variable attenuation of kinetic energy is predetermined by the non-uniform transverse cross-sectional geometry of wire 61 over the length of wire 61 to protect passengers weighing from about 110 pounds to about 241 pounds from injury during a crash, thereby requiring no adjustment of the rate of kinetic energy attenuation by the passenger. Crashworthy aircraft seat 11 is inherently self-adjusting, and requires no manual adjustment by the passenger.

It should be apparent from the foregoing that an invention having significant advantages has been provided. While the invention is shown in a limited number of forms, it is not limited to just these forms, but is susceptible to various changes and modifications without departing from the spirit thereof.

I claim:

1. A crashworthy aircraft seat for protecting a passenger from injury during a crash of an aircraft during which time the passenger's spine is compressing as a result of a crash pulse, the crashworthy aircraft seat comprising:

a support structure coupled to the aircraft;

a seat assembly slidingly associated with the support structure for movement along a generally vertical axis, the seat assembly having a plurality of upright members;

guide means coupled to the support structure for guiding the upright members as the seat assembly slides relative to the support structure;

means for variably attenuating kinetic energy as the seat assembly and the passenger move vertically downward relative to the support structure from an initial start position to an end position during the crash;

wherein the means for variably attenuating kinetic energy is a member associated with a selected one of the seat and support structure which has a selected transverse, cross-sectional geometry that is non-uniform over a length thereof, the means being selected from the group consisting of plastically deformable wires, tube deformers, tube benders and metal shavers; and wherein the selected transverse, cross-sectional geometry of the means for variably attenuating kinetic energy attenuates more energy at the beginning of the crash pulse as the passenger's spine is compressing, but then attenuates less energy at a later time during the crash pulse after the passenger's spine is fully compressed.

2. The crashworthy aircraft seat of claim 1, wherein the cross-sectional geometry of the wire defines an initial cross-sectional area near an upper end thereof which tapers inwardly to an intermediate cross-sectional area and which then tapers outwardly to a final cross sectional area.

3. A crashworthy aircraft seat for protecting a passenger from injury during a crash of an aircraft, the crashworthy aircraft seat comprising:

a support structure coupled to the aircraft;

a seat assembly slidingly associated with the support structure for movement along a generally vertical axis, the seat assembly having a plurality of upright members;

guide means coupled to the support structure for guiding the upright members as the seat assembly slides relative to the support structure;

means for variably attenuating kinetic energy as the seat assembly and the passenger move vertically downward relative to the support structure from an initial start position to an end position during the crash;

wherein the means for variable attenuating kinetic energy is a member associated with a selected one of the seat and support structure which has a selected transverse, cross-sectional geometry that is non-uniform over a length thereof;

wherein the means for variably alternating kinetic energy is a wire having a first end, a second end and a length defined therebetween, the wire having cross-sectional geometry that is non-uniform over the length thereof; and wherein the cross-sectional geometry of the wire defines an initial thickness near an upper end thereof which tapers inwardly to an intermediate thickness and which then tapers outwardly to a final thickness, the cross-sectional geometries being predetermined so that the means for attenuating energy attenuates kinetic energy at a predetermined rate and according to predetermined timing.

4. The crashworthy aircraft seat of claim 2, wherein the inward and outward tapering of the thickness is linear.

5. The crashworthy aircraft seat of claim 2, wherein the inward and outward tapering of the thickness is non-linear.

* * * * *